April 23, 1968 C. L. LOVERCHECK 3,379,169
APPLICATOR-RESERVOIR DRUM INCLUDING MEANS TO CONVEY
PARTICULATE COATING MATERIAL
Filed May 28, 1963
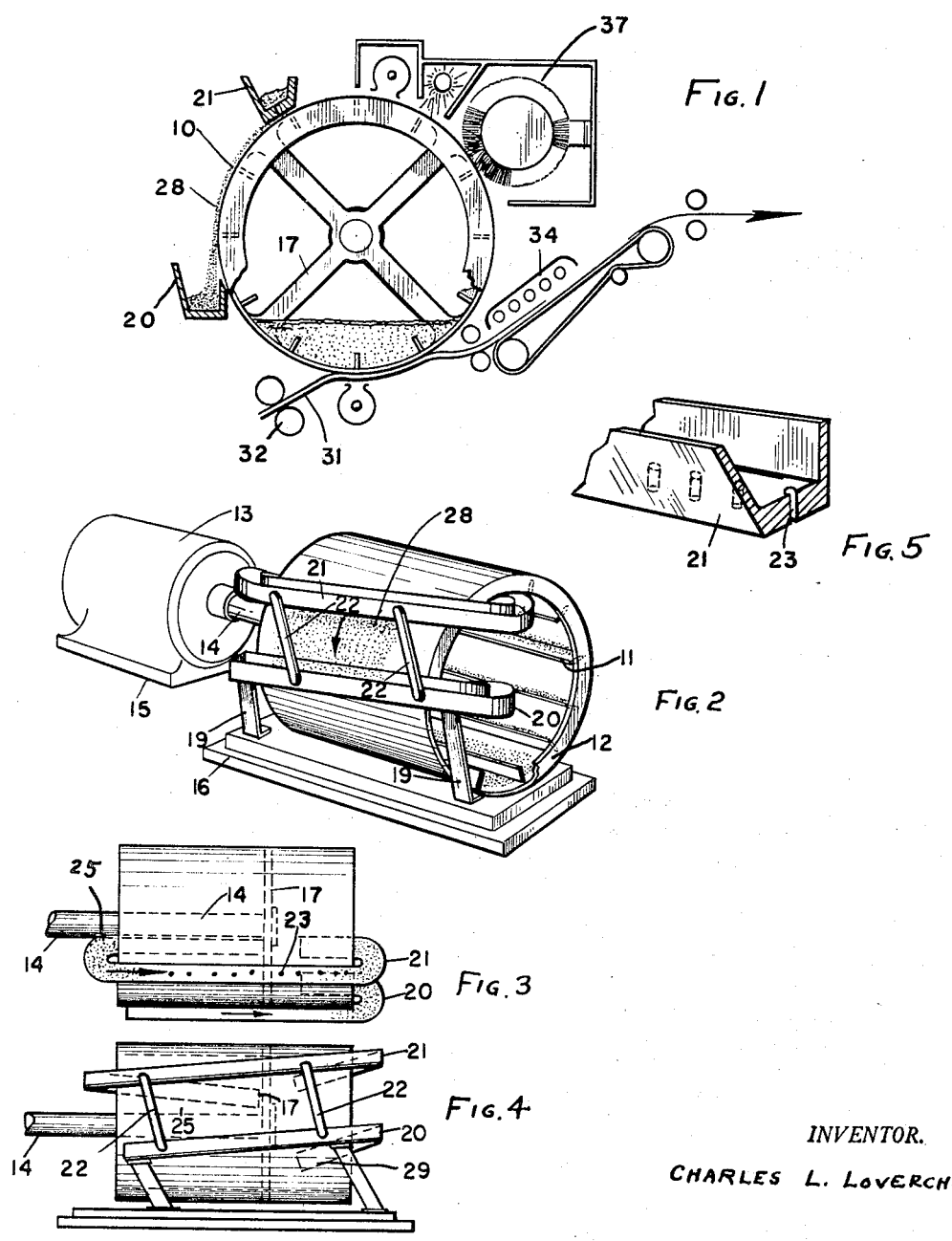
INVENTOR.
CHARLES L. LOVERCHECK

United States Patent Office 3,379,169
Patented Apr. 23, 1968

3,379,169
APPLICATOR-RESERVOIR DRUM INCLUDING
MEANS TO CONVEY PARTICULATE COAT-
ING MATERIAL
Charles L. Lovercheck, 632 W. 7th St.,
Erie, Pa. 16502
Filed May 28, 1963, Ser. No. 283,930
3 Claims. (Cl. 118—258)

ABSTRACT OF THE DISCLOSURE

In a coating apparatus a horizontally disposed rotary applicator roll, the inside of which comprises a reservoir for particulate coating material, in combination with a pair of vibratory trough means whereby said particulate material is received and conveyed out of the rotating roll by an upper one of said trough means, cascaded onto the applicator portion of said roll and the excess of said cascaded material returned to the reservoir by a lower one of said trough means.

---

This invention relates to conveyors and, more particularly, to copying machines utilizing conveyors wherein material must be conveyed across the periphery of a drum and deposited on the drum.

Copying machines of the general type disclosed herein were previously made with various elaborate devices for depositing the powder like material on the drums. These machines are generally known as the Xerox type of machine.

In the machine disclosed herein, a drum is provided with the powder material stored inside the drum. The conveyor picks up the material from inside the drum and carries it across the outside surface thereof and deposits part of it on the outer periphery of the drum as the material moves on the conveyor across the outside of the drum.

It is, accordingly, an object of the present invention to provide an improved conveyor.

Another object of the invention is to provide an improved copying machine.

A further object of the invention is to provide a conveyor which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view partly in cross section of a machine according to the invention;

FIG. 2 is an isometric side view of the machine shown in FIG. 1;

FIG. 3 is a top view of the drum shown in FIG. 2;

FIG. 4 is a side view of the drum shown in FIGS. 1 and 2; and

FIG. 5 is an enlarged cross sectional view of the conveyor track.

Now with more particular reference to the drawing, the machine shown is generally of the type shown in Patent No. 2,807,233. The conveyor utilized in the machine herein is generally of the type shown in British Patent No. 279,119; however, in the present invention, the conveyor is not spiral shaped but, rather, has a straight intermediate part and curved ends which bend back on themselves.

The machine has a hollow drum 10 having radially directed slats 11 fixed to its inner periphery. The slats 11 extend axially from one of the rims 12 to the other. These rims are ring like, inwardly extending flanges fixed to the inner periphery of the drum 10 and extending radially inwardly slightly; for example, approximately one inch. The slats 11 are welded to the rims 12 at their outer ends.

The drum 10 is driven, for example, by a motor 13. The motor 13 may be supported on a base 15 and the conveyor may be supported on a base 16. A shaft 14 extends inwardly and it is fixed to spokes 17 which radiate outwardly and are fixed to the inner periphery of the drum.

The conveyor is supported on leaf springs 19. The leaf springs 19 are fixed at their lower ends to the base 16 and they are fixed at their upper ends to a lower conveyor trough 20. An upper conveyor trough 21 is fixed to the lower conveyor trough 20 by means of arms 22 which are rigidly fixed to their respective troughs at their upper and lower ends. The upper trough 21 has spaced holes 23 in the bottom thereof and, through these holes, the powder material used in the ordinary Xerox process falls as the powder moves along the trough. The lower conveyor trough 20 is disposed below the horizontal diameter of the drum 10 and it receives the surplus powder that falls off of the drum and returns the surplus powder to the inside of the drum.

In operation, the powder material is received in the bottom of the drum 10 and it is carried to the upper diametrical portion by the slats 11 from where it falls into an end 25 of the upper trough 21. Thereby, it is conveyed out and up across the outer periphery of the drum where it falls through the holes 23 and slides down over the outer periphery of the drum at 28. The surplus powder which does not stick to the drum is caught in the lower trough and is conveyed back into the trough through ends 29 and redeposited therein where it will be carried up and fall into the ends 25 of the upper conveyor trough 21.

A sheet of paper 31 is shown running between rollers 32 where it passes over the periphery of the drum 10 and out under a heat source 34 and thence over suitable rollers to an outlet. A cleaning mechanism 37 is shown which is conventional in this type of machine.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In a coating apparatus
    a hollow generally cylindrical drum having an opening at each end rotatable about a horizontal axis,
    means fixed to, and carried on, the inner periphery of said rotatable drum comprising means to convey, upwardly, coating material contained within the drum and to gravity discharge said material at an upper zone within the drum,
    a vibratory conveyor having an upper and a lower trough each having an axially extending portion fixed together,
    said trough being positioned adjacent the outside of said drum,
    said upper trough axially extending portion overlying a part of the outer periphery of said drum,
    said outer periphery comprising the applicator of said apparatus,
    said lower trough axially extending portion being below said upper trough axially extending portion,
    each said trough having a discharge end discharging into the inside of said drum, said upper trough having axially spaced holes in the bottom whereby to discharge coating material onto said part of the outer periphery of the drum, said upper trough having an inlet end extending into the hollow of said drum to receive material falling from said means to convey, said lower trough portion which is below said upper trough portion further being associated with the drum surface so as to receive the excess of material discharged onto said part of the outer periphery, and resilient means supporting said troughs.

2. The conveyor system recited in claim 1 wherein said means to support said troughs comprise leaf springs.

3. The machine recited in claim 1 wherein said means to convey comprises axial slats fixed to the inner periphery of said drum.

References Cited
UNITED STATES PATENTS

| | | | |
|---|---|---|---|
| 2,535,109 | 12/1950 | Wigton | 34—164 X |
| 2,887,023 | 5/1959 | Young | 118—637 X |
| 3,097,958 | 7/1963 | Morris | 118—303 |
| 2,847,767 | 8/1958 | Carrier | 34—164 |
| 3,084,450 | 4/1963 | Hansen | 34—164 |
| 3,122,455 | 2/1964 | Grimm et al. | 118—637 |

MORRIS KAPLAN, *Primary Examiner.*

W. D. MARTIN, *Examiner.*